United States Patent Office

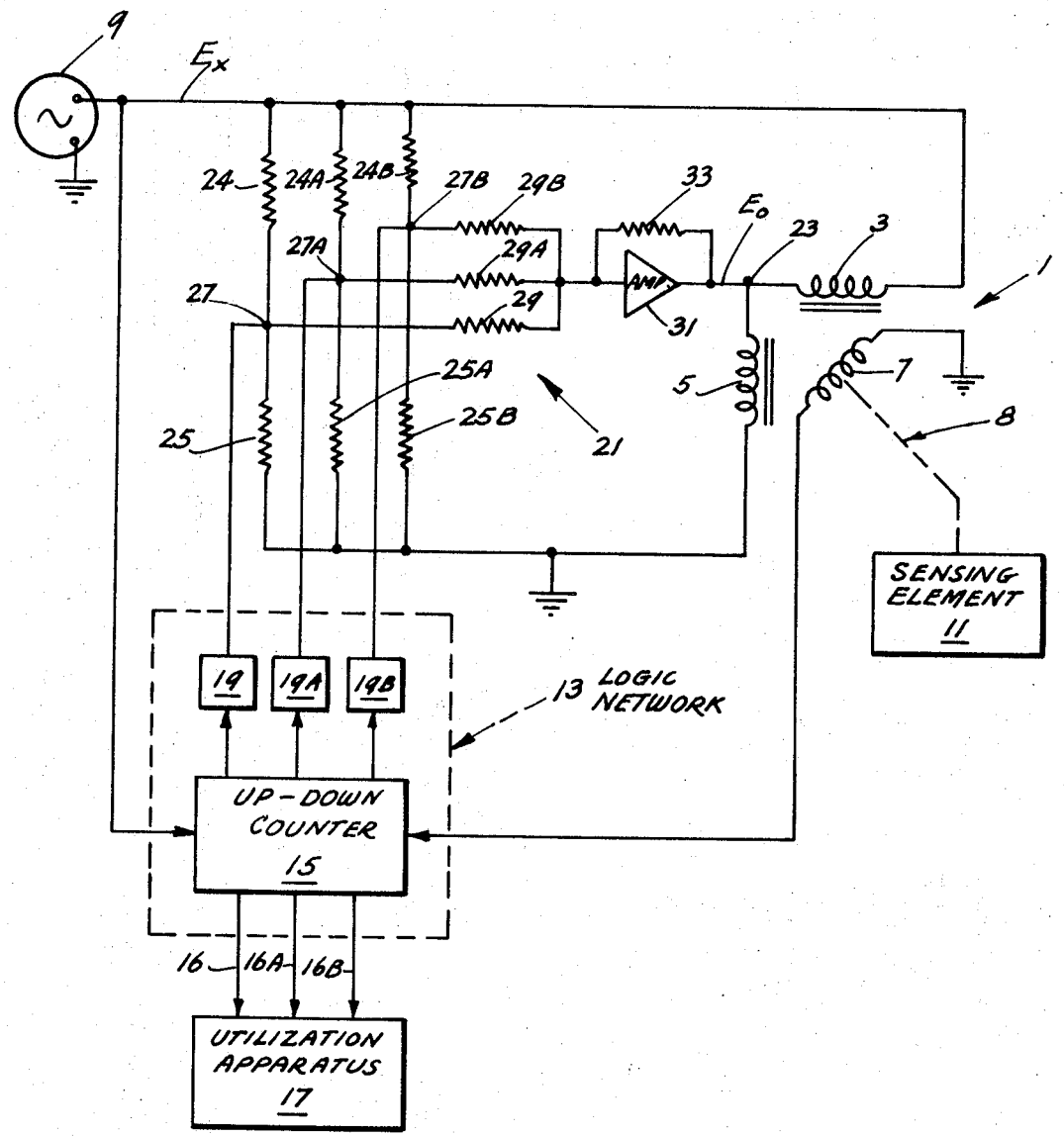

3,562,740
Patented Feb. 9, 1971

3,562,740
ROTARY TRANSFORMER NULLING SYSTEM
Benjamin M. Watkins, Lodi, N.J., assignor to The Bendix
Corporation, a corporation of Delaware
Filed Feb. 13, 1967, Ser. No. 615,791
Int. Cl. H03k *13/04;* G05g *19/00*
U.S. Cl. 340—347    6 Claims

ABSTRACT OF THE DISCLOSURE

An apparatus including a follow-up having no moving parts for providing an output corresponding to the angular displacement of the rotor of a rotary transformer, such as a synchro or resolver, comprising a logic network connected to the rotor of the rotary transformer and receiving error signals therefrom and providing an output corresponding to the angular displacement of the rotor from a predetermined position, and the output of the logic network being applied to the stator windings of the rotary transformer and rotating the stator magnetic field to null the error signals from the rotor. The logic network may provide either an analog or digital output corresponding to the angular displacement of the rotor.

BACKGROUND OF THE INVENTION

Field of the invention

This invention relates to apparatus for providing an output signal corresponding to the angular position of the rotor of a rotary transformer and more particularly to such apparatus including a follow-up having no moving parts.

Prior art

The follow-up used in a servo loop for nulling the output of a rotary transformer as used heretofore utilized a motor driving another rotary transformer to null the error signal from the first rotary transformer. Such systems are subject to hunting or gear backlash and are generally inaccurate.

SUMMARY

This invention contemplates a system for providing an output signal corresponding to the angular displacement of a winding from a predetermined position, comprising a rotary transformer having a pair of windings rotatable relative to one another, one of the windings being energized and providing a magnetic field angularly displaced in accordance with energization and the other winding providing an error signal corresponding to its angular displacement relative to the magnetic field, logic means responsive to the error signal for providing the output signal and means for transmitting the output signal to a junction of the energized winding to rotate the magnetic field to null the error signal.

The main object of the present invention is to provide a follow-up having no moving parts for nulling the output of a rotary transformer thereby increasing reliability and accuracy.

This and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWINGS

The single figure of the drawing shows a schematic diagram of a novel analog shaft position to digital converter constructed according to the invention.

Referring to the drawing, there is shown a rotary transformer 1, such as a sine-cosine resolver, having stator windings 3 and 5 in spatial quadrature and a rotor winding 7 mounted on a shaft 8. The synchro is energized by a source of A.C. power 9 of value $E_x$ connected across stator windings 3 and 5.

Rotor winding 7 and shaft 8 are positioned by a sensing element 11, for example, a diaphragm for sensing pressure, and a voltage, referred to hereafter as an error signal, is developed across rotor winding 7 corresponding to the angular displacement of rotor winding 7 relative to the magnetic field of stator windings 3 and 5.

Rotor winding 7 is connected to a logic network 13 which includes an up-down counter 15. The up-down counter 15 is connected to power source 9 which provides a reference signal for demodulating the error signal provided by rotor winding 7.

Up-down counter 15 may be of the type provided by combining the analog-to-digital converter disclosed in U.S. Pat. 3,079,598 issued to Wald on Feb. 26, 1963 with a conventional up-down digital counter so that the analog signal from rotary transformer 1 of the present invention is applied to the Wald device. The Wald device, in turn, provides a read-out drive signal at conductor 41 thereof which functions as a counting direction signal for counter 15 of the present invention and provides a serial binary output at conductor 34 as pulses to be counted by the aforenoted counter 15. It should be noted that when the Wald device is used as just described, the flip-flops thereof ($FF_1$, $FF_2$, $FF_4$, $FF_8$) are not allowed to be reset by the cycle reset signal at conductor 39 of the Wald patent.

The output signals provided by logic network 13 on lines 16, 16A and 16B are the digital representation of the angular displacement of the rotor shaft from a predetermined position. Lines 16, 16A and 16B are connected to a utilization apparatus 17 which may, for example, be a display unit. The logic network 13 also includes switches 19, 19A and 19B connected to the up-down counter 15 which controls the switches in accordance with the error signal provided by rotor winding 7.

A resistor divider network 21 controlled by switches 19, 19A and 19B is connected across source 9 and to the junction 23 of stator windings 3 and 5. Resistor network 21 comprises a pair of series connected resistors 24 and 25, a pair of series connected resistors 24A and 25A, and a pair of series connected resistors 24B and 25B, the pairs being connected in parallel across source 9. Switches 19, 19A and 19B are connected respectively to a junction 27 of resistors 24 and 25, to a junction 27A of resistors 24A and 25A, and to a junction 27B of resistors 24B and 25B.

Resistors 29, 29A and 29B are connected between the junctions 27, 27A and 27B, respectively, and the input of an amplifier 31. The output of amplifier 31 is connected to the junction 23 of stator windings 3 and 5 and a feedback resistor 33 connects the output of amplifier 33 to its input.

Resistance divider network 21 incrementally provides the potentials at junction 23 which determine the angular direction of the stator magnetic field. For this reason switches 19, 19A and 19B when deenergized provide a path to ground for the junctions 27, 27A and 27B. Thus, where the logic network provides a zero in the least significant bit, switch 19 is deactivated and grounds junction 27 so that current flowing from the source of A.C. power 9 through resistance 24 takes the path of least resistance through switch 19 to ground. If, however, the logic network 13 provides a "one" in the least significant bit, switch 19 is energized and disconnects junction 27 from ground so that current flows through resistance 29 to point 23. The magnitude of the current at point 23 depends on the ratio of the resistors 24, 25 and 29. This holds true also for each of the other resistance paths comprising resistors 24A, 25A, 29A and resistors 24B, 25B, 29B. As many other resistance paths as needed may be used.

The following equations define the amplitude of voltage $E_o$ at junction 23 of stator windings 3 and 5, in terms of $I_o$, the output current of amplifier 31 and the resistance $R_{33}$ of resistor 33.

(1) $$E_o = I_o R_{33}$$

so that (2) $$E_o = \frac{(E_x)(R_{33})}{R_{29}\left(1+\frac{R_{24}}{R_{25}}\right)+R_{24}}$$

where $R_{24}$ is the resistance of resistor 24, $R_{25}$ is the resistance of resistor 25 and $R_{29}$ is the resistance of resistor 29.

The values of resistors in the resistor-divider network 21 are determined by choosing the value of $E_o$ to be provided by the least significant bit, for example, one millivolt, and choosing the values of two of the three resistances $R_{24}$, $R_{25}$ and $R_{29}$. The equation $$E_o = \frac{(R_{33})E_x}{R_{29}\left(1+\frac{R_{24}}{R_{25}}\right)+R_{24}}$$

is then solved for the value of the third resistance.

The same procedure is followed to determine the values of resistors in the other resistance paths where, however, the value of $E_o$ will be a binary multiple of the voltage provided by the least significant bit. Thus, the values of $E_o$ will progress in a binary manner, that is, 1, 2, 4, 8, etc.

$E_o$ is the voltage across stator winding 5 and the voltage across stator winding 3 is $E_x - E_o$. Varying $E_o$ varies the ratio of $E_o$ to $E_x$ and provides a rotating stator field which nulls the error signal from rotor 7. As mentioned above, the error signal is a function of the relative angular displacement of the rotor relative to the stator field.

The logic network 13 will count up or down in increments depending on the phase of the error signal from rotor winding 7 until the error signal is nulled.

OPERATION

Rotor winding 7 of synchro 1 is mechanically positioned relative to the magnetic field of stator windings 3 and 5 by an analog signal from sensing element 11 and an error signal corresponding to the angular displacement of rotor winding 7 relative to the stator magnetic field appears across rotor winding 7. The error signal is applied to the up-down counter 15 of logic network 13 which provides a digital representation of the analog signal.

The up-down counter 15 operates switches 19, 19A and 19B and controls the transfer function of resistor network 21 to vary the voltage $E_o$ provided at junction 23 of stator windings 3 and 5.

Varying the voltage $E_o$ rotates the magnetic field provided by the stator windings 3 and 5 and the magnetic field is rotated until it is perpendicular to the angular displacement of the rotor winding 7 to null the error signal across rotor winding 7.

Logic network 13 provides a digital representation of the analog shaft position on lines 16, 16A and 16B which may be displayed on appropriate apparatus 17.

While the embodiment of the invention shown and described herein converts an analog shaft position to a digital representation, it should be understood that the invention is not limited to such use and analog signals may be applied to any suitable circuit, such as an integrator, to vary the potential at junction 23 and activate display apparatus 17.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A signal nulling system comprising:
    a rotary transformer having a pair of windings angularly displaceable relative to one another;
    one of said windings connected to a source of energizing voltage and energized by the voltage therefrom to provide a magnetic field angularly displaced in accordance with the energization, and the other winding providing a signal corresponding to its angular displacement relative to the magnetic field;
    logic means connected to said other winding and responsive to the signal therefrom for providing an output corresponding to the relative angular displacement of said windings;
    means including a resistor network connected to the energized winding and to the logic means and having a plurality of pairs of serially connected resistors, with each of the pairs of resistors being connected in parallel across the energizing voltage source; and
    the resistor network transmitting the output from the logic means to the energized winding for rotating the magnetic field to null the signal provided by the other winding.

2. A system as described in claim 1 in which the signal source provides an analog signal and the logic means includes an analog to digital converter for providing a digital output corresponding to the analog signal.

3. A system as described in claim 1 in which the logic means includes switching means for controlling the means connected to the energized winding to vary energization of said winding.

4. A signal nulling system comprising:
    a signal source having a pair of windings angularly displaced relative to one another in accordance with an analog input;
    one of the windings connected to a source of energizing voltage and energized by the voltage therefrom for providing a magnetic field angularly displaced in accordance with the energization, and the other winding providing a signal corresponding to its angular displacement relative to the magnetic field;
    a logic network connected to said other winding and including means for converting the signal therefrom to a digital representation corresponding to the analog input;
    a resistor network connected to the energized winding and to the logic network and including a plurality of pairs of serially connected resistors, with each of the pairs of resistors being connected in parallel across the energizing voltage source; and the resistor network controlled by the logic network for varying energization of the energized winding in accordance with the digital representation for rotating the magnetic field to null the signal provided by the other winding.

5. A system as described in claim 4 in which the logic network includes an up-down counter responsive to the signal from the other winding for providing a digital representation corresponding to the analog input.

6. A system as described in claim 4 in which the logic network includes switching means and the resistor network is controlled by the switching means in accordance with the digital representation.

References Cited
UNITED STATES PATENTS

| | | | |
|---|---|---|---|
| 2,988,737 | 6/1961 | Schroeder | 340—347 |
| 2,853,699 | 9/1958 | O'Neil | 318—20X |
| 3,247,504 | 4/1966 | Emmerich | 340—347 |
| 3,250,905 | 5/1966 | Schroeder et al. | 340—347X |

MAYNARD R. WILBUR, Primary Examiner

C. D. MILLER, Assistant Examiner

U.S. Cl. X.R.

318—20; 340—198